(12) United States Patent
Zhang et al.

(10) Patent No.: US 12,468,787 B2
(45) Date of Patent: Nov. 11, 2025

(54) SOFTWARE PROTECTION METHOD AND APPARATUS, ELECTRONIC DEVICE, AND STORAGE MEDIUM

(71) Applicant: Tsinghua University, Beijing (CN)

(72) Inventors: Chao Zhang, Beijing (CN); Wende Tan, Beijing (CN); Yuan Li, Beijing (CN); Ying Liu, Beijing (CN); Jianping Wu, Beijing (CN)

(73) Assignee: Tsinghua University, Beijing (CN)

( * ) Notice: Subject to any disclaimer, the term of this patent is extended or adjusted under 35 U.S.C. 154(b) by 188 days.

(21) Appl. No.: 18/467,252

(22) Filed: Sep. 14, 2023

(65) Prior Publication Data
US 2024/0004967 A1    Jan. 4, 2024

Related U.S. Application Data (63) Continuation of application No. PCT/CN2021/123329, filed on Oct. 12, 2021.

(30) Foreign Application Priority Data

Mar. 15, 2021 (CN) .......................... 202110289668.2

(51) Int. Cl.
*G06F 21/12* (2013.01)
*G06F 21/62* (2013.01)

(52) U.S. Cl.
CPC ........ *G06F 21/121* (2013.01); *G06F 21/6245* (2013.01)

(58) Field of Classification Search
CPC .. G06F 21/121; G06F 21/6245; G06F 21/125; G06F 21/52; G06F 21/54;
(Continued)

(56) References Cited

U.S. PATENT DOCUMENTS

2001/0007131 A1* 7/2001 Galasso ................ G06F 21/575
                                                              713/189
2008/0163382 A1* 7/2008 Blue ................... G06F 12/1491
                                                               726/28
(Continued)

FOREIGN PATENT DOCUMENTS

CN        102222194 A       10/2011
CN        102880461 A        1/2013
(Continued)

OTHER PUBLICATIONS

Office Action and Supplementary European Search Report of corresponding European Patent Application No. 21931204.8, dated Jun. 26, 2024, 10 pages.
(Continued)

*Primary Examiner* — Harunur Rashid
(74) *Attorney, Agent, or Firm* — Tucker Ellis LLP (57) ABSTRACT

The present disclosure provides a software protection method and apparatus, an electronic device and a storage medium. By identifying the sensitive data in the software source code and determining the point of use of the sensitive data; setting the sensitive data in the read-only section of the compilation product of the software source code so that the sensitive data is stored in the read-only area when the software is running; inserting the check code into the above point of use of the sensitive data, where the check code is used to check whether the sensitive data read is in the read-only area while the software is running, and determine whether to continue running the software according to the check result, embodiments of the present disclosure realize the integrity verification of the sensitive data, and thereby prevent the sensitive data from being corrupted with low performance overheads.

18 Claims, 4 Drawing Sheets

(58) Field of Classification Search
CPC .......... G06F 8/434; G06F 21/60; G06F 21/64; G06F 8/37; G06F 8/41

See application file for complete search history.

(56) References Cited

U.S. PATENT DOCUMENTS

| | | | |
|---|---|---|---|
| 2012/0102307 A1* | 4/2012 | Wong | G06F 21/575 |
| | | | 713/189 |
| 2017/0134390 A1* | 5/2017 | Chan | G06F 21/6245 |
| 2019/0171846 A1 | 6/2019 | Conikee et al. | |
| 2020/0265135 A1 | 8/2020 | Michie et al. | |

FOREIGN PATENT DOCUMENTS

| | | |
|---|---|---|
| CN | 102930185 A | 2/2013 |
| CN | 103955362 A | 7/2014 |
| CN | 104011733 A | 8/2014 |
| CN | 104981812 A | 10/2015 |
| CN | 105426223 A | 3/2016 |
| CN | 108920253 A | 11/2018 |
| CN | 110737911 A | 1/2020 |
| CN | 111381879 A | 7/2020 |
| CN | 111400702 A | 7/2020 |
| CN | 111881485 A | 11/2020 |
| CN | 112100686 A | 12/2020 |
| CN | 112395587 A | 2/2021 |
| CN | 113032737 A | 6/2021 |
| EP | 3 355 218 A1 | 8/2018 |
| KR | 20190043850 A | 4/2019 |

OTHER PUBLICATIONS

Chao Zhang et al., "VTint: Protecting Virtual Function Tables' Integrity", Proceedings 2015 Network and Distributed System Security Symposium, Feb. 11, 2015, Retrieved from the Internet: URL: https://people.eecs.berkeley.edu/~dawnsong/papers/VTint-%20Protecting%20Virtual%20Function%20Tables'%20Integrity_feb%202015.pdf, 15 pages.

Robert Gawlik et al., "Towards Automated Integrity Protection of C++ Virtual Function Tables in Binary Programs", Pervasive Technologies Related to Assistive Environments, Dec. 8, 2014, pp. 396-405.

International Search Report and Written Opinion of corresponding International Application No. PCT/CN2021/123329, dated Jan. 5, 2022, 13 pages.

First Office Action of corresponding Chinese Application No. 202110289668.2, dated Sep. 3, 2021, 11 pages.

Notification to Grant Patent Right for Invention of corresponding Chinese Application No. 202110289668.2, dated Oct. 20, 2021, 6 pages.

Liu Minghui et al., "Research on Sensitive Data Protection Technology in Cloud Environment", Telecommunications Science, dated Nov. 30, 2014, 10 pages.

Meng Shanshan, "Research on Software Protection of Smart Mobile Devices", Southeast University, dated Mar. 1, 2015, 89 pages.

Liu Tingting, "Research on Key Technologies of Data Security towards Cloud Computing", People's Liberation Army Information Engineering University (PLAIEU), dated Apr. 20, 2013, 144 pages.

\* cited by examiner

SOFTWARE PROTECTION METHOD AND APPARATUS, ELECTRONIC DEVICE, AND STORAGE MEDIUM

CROSS-REFERENCE TO RELATED APPLICATION

The present application is a continuation of the International Application No. PCT/CN2021/123329, filed on Oct. 12, 2021, which claims priority to Chinese Patent Application No. 202110289668.2, titled "SOFTWARE PROTECTION METHOD AND APPARATUS, ELECTRONIC DEVICE, AND STORAGE MEDIUM", filed to China National Intellectual Property Administration on Mar. 15, 2021. Both of the aforementioned applications are hereby incorporated by reference in their entireties.

TECHNICAL FIELD

The present disclosure relates to computer technology, in particular, to a software protection method and apparatus, an electronic device and a storage medium.

BACKGROUND

Computer software has been facing serious security threats, among which memory corruption vulnerability is the most widespread security threat. These vulnerabilities are often exploited by attackers to compromise sensitive data used by sensitive operations, thereby hijacking or compromising the sensitive operations.

In the related art, the most fundamental defense scheme against the above threats is to ensure the integrity of the sensitive data, and a common mechanism is to achieve integrity verification of the sensitive data based on a block cipher algorithm, but this method has a high performance overhead.

SUMMARY

In response to the above problems, the present disclosure provides a software protection method and apparatus, an electronic device and a storage medium.

In a first aspect, the present disclosure provides a software protection method, including: identifying sensitive data in a software source code and determining a point of use of the sensitive data; setting the sensitive data in a read-only section of a compilation product of the software source code so that the sensitive data is stored in a read-only area when the software is running; and inserting a check code at the point of use of the sensitive data, where the check code is used to check whether the sensitive data read is in the read-only area while the software is running, and determine whether to continue running the software according to a check result.

In other embodiments, the identifying the sensitive data in the software source code and determining the point of use of the sensitive data includes: identifying data with a special marker as the sensitive data; and determining that the point of a memory read instruction associated with the sensitive data is the point of use of the sensitive data, where the memory read instruction is used to read the sensitive data by a pointer.

In other embodiments, before the identifying the data with the special marker as the sensitive data, the method further includes: identifying an instruction containing a sensitive operation in the software source code according to a preset rule, and marking data used by the instruction using the special marker; and associating the data with the memory read instruction.

In other embodiments, the method further includes: marking the memory read instruction using the special marker; the inserting the check code at the point of use of the sensitive data includes: inserting the check code before the marked memory read instruction; or, modifying the marked memory read instruction to a memory read code containing the check code.

In other embodiments, the setting the sensitive data in the read-only section of the compilation product of the software source code includes: identifying a collection of legitimate values of the sensitive data, constituting an allowlist, and setting data in the allowlist in the read-only section of the compilation product of the software source code; and setting the sensitive data as the data in the allowlist.

In other embodiments, the determining whether to continue running the software according to the check result includes: continuing running the software if the sensitive data read is in the read-only area; and blocking the software from running if the sensitive data read is not in the read-only area.

In other embodiments, the check code is generated based on the features provided by different processors, hardware, or operating systems.

In a second aspect, the present disclosure provides a software protection apparatus, including: an identifying module, configured to identify sensitive data in a software source code, and determine a point of use of the sensitive data; a processing module, configured to set the sensitive data in a read-only section of a compilation product of the software source code so that the sensitive data is stored in a read-only area when a software is running; an inserting module, configured to insert a check code at the point of use of the sensitive data, where the check code is used to check whether the sensitive data read is in the read-only area while the software is running, and determine whether to continue running the software according to a check result.

In a third aspect, the present disclosure provides an electronic device, including: at least one processor and a memory; the memory stores computer executable instructions; and the at least one processor executes the computer executable instructions stored in the memory, enables the at least one processor to execute the method according to any of the above methods described in the first aspect.

In a fourth aspect, the present disclosure provides a readable storage medium, where the readable storage medium stores computer executable instructions, and when the computer executable instructions are executed by a processor, the method according to any one of the first aspect is implemented.

In a fifth aspect, the present disclosure provides a computer program product including a computer program which, when executed by a processor, the method according to any one of the first aspect is implemented.

In the software protection method and apparatus, the electronic device and the storage medium provided by the present disclosure, the sensitive data in the software source code is identified and the point of use of the sensitive data is determined; the sensitive data is set in the read-only section of the compilation product of the software source code so that the sensitive data is stored in the read-only area when the software is running; the check code is inserted into the above point of use of the sensitive data, where the check code is used to check whether the sensitive data read is in the read-only area while the software is running, and determine whether to continue running the software according to the check result; that is, in the embodiments of the present disclosure, by inserting the check code at the point of use of the sensitive data, so that whether the sensitive data to be read is in the read-only area is checked by invoking the check code when the software is running, the integrity verification of the sensitive data is realized, thereby preventing the sensitive data from being corrupted with low performance overheads.

DESCRIPTION OF EMBODIMENTS

In order to describe objections, technical solutions, and advantages of examples of the present disclosure more clearly, the technical solutions in the embodiments of the present disclosure will be described hereunder clearly and comprehensively with reference to the accompanying drawings in the examples of the present disclosure.

Computer software has always faced serious security threats, of which memory corruption vulnerability is one of the most widespread security threats. These vulnerabilities are often exploited by attackers to compromise the operands of sensitive operations (that is, sensitive data), thereby hijacking or corrupting sensitive operations.

Among them, the sensitive operations include but are not limited to: program control flow transfers (program counter update), sensitive API calls (such as system( ) functions, SQL queries, etc.), security checks (various allowlist checks, etc.), and business-critical operations (such as transfer, password decryption, etc.). The operands of sensitive operations, that is, the sensitive data, include but are not limited to: the operands of the program control flow transfers (function return address, function pointer, etc.), arguments of sensitive API calls (commands executed by system( ) functions, statement arguments of SQL queries), allowlist configurations used for security checks, and operands of business-critical operations (such as the receiving address of transfer operations, ciphertext input of decryption operations), and so on.

Figure 1:
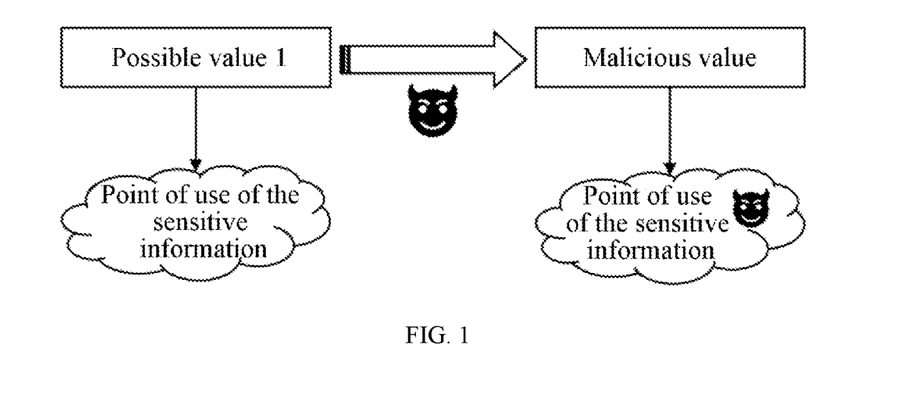
FIG. 1 is a schematic of the corruption of the sensitive data in related art.

Once sensitive data is compromised, attackers can launch a variety of attacks. FIG. 1 is a schematic diagram of the corruption of the sensitive data in the related art, as shown in FIG. 1, when the sensitive data, such as the possible value 1, is corrupted by an attacker and becomes a malicious value, the malicious value is used at the point of use of the sensitive information. For example, attackers can break function pointers or function return addresses to hijack program control flow, or compromise arguments of sensitive API functions such as system( ) or execve( ) to perform dangerous operations (such as command injection attacks, SQL injection attacks), which are currently the most popular and harmful types of attacks. Attackers can also compromise allowlisted configurations used in security checks, such as user identification (uid), conditional flags, or other metadata (such as configuration information, policy information, or shadow memory) and so on to bypass deployed security measures or launch data-oriented attacks. Attackers can also compromise operands for business-critical operations, such as hijacking the receiving address of a transfer operation, decrypting the target ciphertext, and so on.

Figure 2:
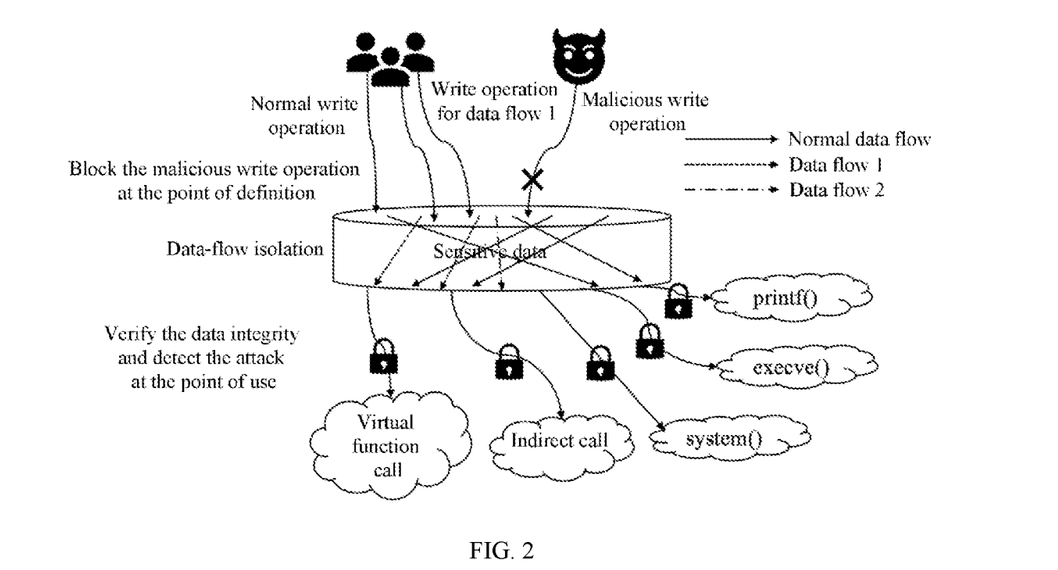
FIG. 2 is a schematic diagram of the three mechanisms for verifying the integrity of the sensitive data in the related art.

In response to the threat of the sensitive data being corrupted and leading to the hijacking of the sensitive operations, the most fundamental defense scheme needs to ensure the data-flow integrity (DFI), that is, to ensure that the data flow graph of the software (the relationship between the point of definition and the point of use) is not violated at runtime, and the point of use of the sensitive information is not corrupted. Data has its point of definition and point of use, and according to different defense deployment stages, the data flow integrity mechanism can be divided into three categories: one is the mechanism that blocks malicious memory read and write operations at the point of definition; the second is the mechanism to isolate sensitive data flow from ordinary data flow; the third is a mechanism for verifying data integrity and detecting attacks at the point of use. FIG. 2 is a schematic diagram of the three mechanisms used in the related art to verify the integrity of the sensitive data.

The first type of mechanism ensures that illegal memory writes do not occur by performing security checks at the point of definitions of the data (memory writes). SoftBound, AddressSanitizer, and other solutions implement boundary check or timing check at the software level, providing strong data flow integrity protection, but their performance overhead is high. MPX (Memory Protection EXtension) is a hardware extension of Intel designed to efficiently perform bounds checking, thereby preventing out-of-bounds type memory corruption attacks and providing spatial memory safety. ARM's MTE (memory tagging extension) hardware mechanism associates each memory word with a corresponding tag, which can be used to achieve spatial and temporal memory safety protection. Both solutions have a high performance overhead, and the related features have been removed from hardware or not yet implemented.

The second type of mechanism provides the data flow integrity protection by isolating sensitive data such as code pointers and blocking potentially harmful memory write operations from corrupting sensitive data. The HDFI (hardware-assisted data-flow isolation) scheme associates each memory word or words with a 1-bit memory tag, while the IMIX (in-process memory isolation extension) scheme associates each memory page with a 1-bit memory tag. This provides strong data flow isolation and security guarantees. Intel 1VIPK (memory protection keys) and ARM DACR (domain access control register) divide memory pages into keys or domains, and provide users with control registers to adjust the permissions of memory pages to achieve data flow isolation. Intel SMAP (supervisor mode access prevention), Intel SMEP (supervisor mode execution prevention), ARM PAN (privileged access never), RISC-V SUM (supervisor user memory access), and other hardware features provide isolation between a kernel mode and a user mode. The defensive strength of these schemes is usually not high enough.

The third type of mechanism protects the sensitive operations by verifying data integrity at the point of use to ensure that the operands used by the sensitive operations have not been tampered with. ARM PA (pointer authentication) mechanism achieves the integrity verification of sensitive data based on a block cipher algorithm, which has been initially applied in Apple mobile phones and other products, and achieved better protection effect, but its performance overhead is large. Solutions such as StackGuard verify the integrity of the return address by placing a canary/cookie on the stack and verifying that the canary/cookie is not corrupted before the function returns, but its defense is weak.

In response to the above problems, the technical conception of the present disclosure is that: by inserting a check code at the point of use of the sensitive data, so that whether the sensitive data to be read is in the read-only area is checked by invoking the check code when the software is running, so as to achieve the integrity verification of the sensitive data, thereby preventing the sensitive data from being corrupted with low performance overheads.

Figure 3:
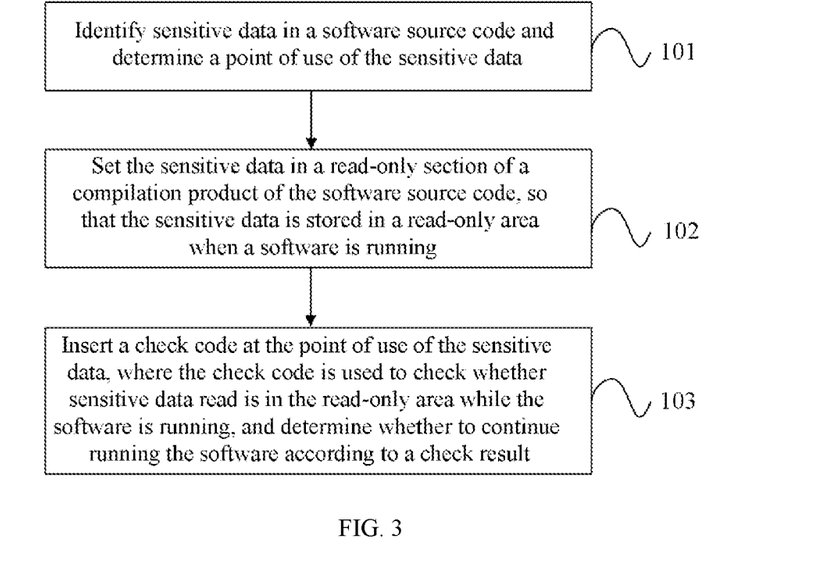
FIG. 3 is a schematic flowchart of a software protection method provided by the present disclosure.

First, an example of the present disclosure provides a software protection method, FIG. 3 is a schematic diagram of a software protection method provided by the present disclosure.

As shown in FIG. 3, the software protection method includes the following steps.

Step 101: identify sensitive data in a software source code and determine a point of use of the sensitive data.

It should be noted that the execution subject of the present disclosure is a compiler in an electronic device, such as an LLVM/Clang compiler, and the present embodiment may be implemented by extending the compiler.

Specifically, for the software source code to be protected, the extended compiler compiles it, and during the compilation process, the extended compiler recognizes sensitive operations provided by the user or sensitive operations depicted by predefined rules. Common sensitive operations include: program control flow transfers (program counter update), sensitive API calls (such as system( ) functions, SQL queries, etc.), security checks (various allowlist checks, etc.), and business-critical operations (such as transfers, password decryption, etc.); the extended compiler automatically identifies the point at which these sensitive operations are invoked in the software (that is, the point of use of the sensitive data) and the sensitive data used by the sensitive operations.

As an embodiment, step 101 includes: identifying data with a special marker as the sensitive data; and determining that the point of a memory read instruction associated with the sensitive data is the point of use of the sensitive data, where the memory read instruction is used to read the sensitive data by a pointer.

Specifically, the sensitive data is marked with the special marker, such as the data (or referred as a Value object) on the LLVM compiler intermediate representation (LLVM IR) can be marked with the special marker (such as a marker referred as ROLoad-md) through the interface provided by the software; then the data can be correlated with certain LLVM IR memory read instructions, indicating that the data read by these IR memory read instructions needs to be protected.

As an embodiment, before the identifying the data with the special marker as the sensitive data, the method further includes: identifying an instruction containing a sensitive operation in the software source code according to a preset rule, and marking data used by the instruction using the special marker; associating the data with the memory read instruction.

Specifically, in the process of software source code compilation, each line of the instruction is gradually scanned, the instruction containing sensitive operations in the software is automatically identified according to predefined rules or target actions provided by the user, and the data used by the instruction is marked with a special marker (such as ROLoad-md), and the data is associated with the memory read instruction.

Step 102, set the sensitive data in a read-only section of a compilation product of the software source code, so that the sensitive data is stored in a read-only area when a software is running.

Specifically, the sensitive data can be set in the read-only section of the compilation product of the software source code, so that the compiled product (that is, the executable file) places the sensitive data in the read-only memory area of the software process when it is loaded and run.

As an embodiment, the step 102 includes: identifying a collection of legitimate values of the sensitive data, constituting an allowlist, and setting data in the allowlist in the read-only section of the compilation product of the software source code; and setting the sensitive data as the data in the allowlist.

Specifically, the extended compiler automatically identifies the collection (allowlist) of legitimate operands values for the sensitive data. It should be noted that most points of use of the sensitive data essentially contain allowlists that consist of a series of immutable data. Examples of these allowlists include, but are not limited to: virtual function tables for C++ software, function pointer tables customized by software developers, formatted strings and hard-coded configuration information, allowlist policies for security checks, receiving addresses for transfer operations, initiators of the sensitive operations, etc. Preferably, the method proposed in the present disclosure automatically identifies these allowlist information by program analysis or user-specified means. In some cases, the allowlist is not explicitly defined in the software source code, for example, the target of the indirect control flow transfer can be calculated at compile time or runtime, but they are not directly stated in the software source code, for these cases, the present disclosure pre-computes these allowlists at the compile time. In other words, users can create an allowlist file and specify the allowlist information in the file, so that the LLVM Pass can obtain the allowlist information after reading the corresponding file; users can also use the LLVM Pass to analyze the source code and automatically identify and build an allowlist of a part of the sensitive data, such as virtual function tables in C++ software.

In turn, the extended compiler places the immutable allowlist data in a tamper-proof area to protect it from corruption (or contamination). Preferably, based on the performance and the ease of use considerations, the present disclosure selects read-only pages in the memory as the tamper-proof area, that is, the protection of the present disclosure may be achieved by placing the allowlist data in the read-only section of the executable file, and after the executable file is loaded and run, the data are stored in the read-only memory area of the process.

In addition, the present disclosure will change the use of the sensitive data in the software to a memory access to the allowlist data placed in the read-only memory, and automatically modify the software to ensure correctness.

Step 103, insert a check code at the point of use of the sensitive data, where the check code is used to check whether sensitive data read is in the read-only area while the software is running, and determine whether to continue running the software according to a check result.

Specifically, the extended compiler inserts the check code at the point of use of the sensitive data, calls the check code when the software is running, and verifies the read-only properties of the sensitive data; if the verification is successful at runtime, the check code continues running the software; if the verification fails at runtime, the check code blocks the software from continuing running. That is, the present disclosure can limit only data from the tamper-proof (read-only memory) area to be used at the point of use of the sensitive data, and can prevent contaminated or corrupted data (non-read-only data) from being used at the point of use of the sensitive data, thereby mitigating memory attacks, thereby protecting the sensitive operations of the software.

As an embodiment, the above method further includes: marking the memory read instruction using the special marker; the step 103 includes: inserting the check code before the marked memory read instruction; or modifying the marked memory read instruction to the memory read code containing the check code.

Specifically, the extended compiler analyzes the software source code in detail and analyzes the instructions one by one to determine whether the instructions have the sensitive operations (including but not limited to virtual function calls). If there is a sensitive operation in an instruction, the LLVM Pass analyzes the source of its operand, finds the corresponding IR memory read instruction, and marks the instruction with ROLoad-md; then modifies all IR memory read instructions marked by the ROLoad-md one by one to insert the check code before the marked memory read instruction, or modify the marked memory read instruction to the memory read code containing the check code therein.

As an embodiment, the check code is generated based on the features provided by different processors, hardware, or operating systems.

Specifically, the extended compiler builds and generates, according to functions such as hardware features of the target platform or features provided by the operating system, functional code that can verify read-only attributes of data. For example, the hardware features of some platform may provide permission settings and checks for the read-only memory page, and some operating systems may provide access permission information for memory page or provide read-only memory address range. These features or information can be used to check whether the target data is in the read-only memory area. Based on these features, the extended compiler can build the functional code to verify the read-only properties of the sensitive data.

In the software protection method provided in this embodiment, the sensitive data in the software is identified and the point of use of the sensitive data is determined; the sensitive data is set in the read-only section of the compilation product of the software source code so that the sensitive data is stored in the read-only area when the software is running; the check code is inserted into the above point of use of the sensitive data, where the check code is used to check whether the sensitive data read is in the read-only area while the software is running, and determine whether to continue running the software according to the check result; that is, in the embodiments of the present disclosure, by inserting the check code at the point of use of the sensitive data, so that whether the sensitive data to be read is in the read-only area is checked by invoking the check code when the software is running, the integrity verification of the sensitive data is realized, thereby preventing the sensitive data from being corrupted with low performance overheads.

Figure 4:
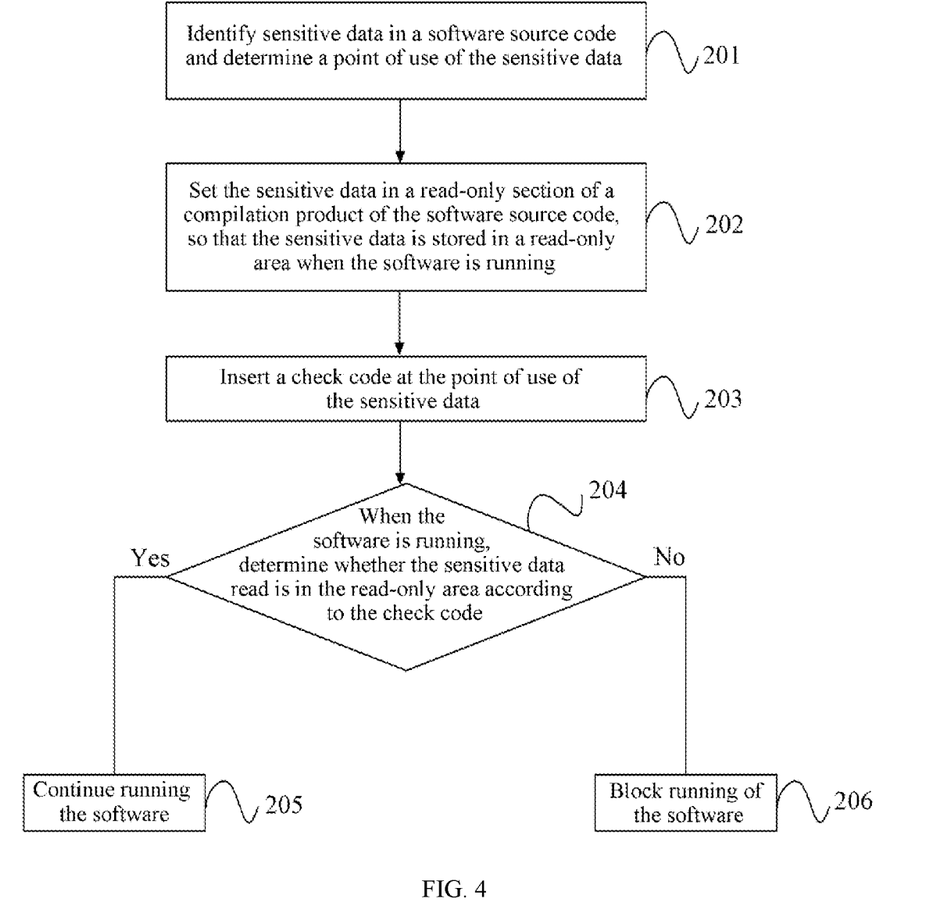
FIG. 4 is a schematic flowchart of another software protection method provided by the present disclosure.

Combined with the foregoing embodiments, FIG. 4 is a schematic flow diagram of another software protection method provided by the present disclosure, as shown in FIG. 4, the software protection method includes:

Step 201, identify sensitive data in the software source code and determine a point of use of the sensitive data;

Step 202, set the sensitive data in a read-only section of a compilation product of the software source code, so that the sensitive data is stored in a read-only area when the software is running;

Step 203, insert a check code at the point of use of the sensitive data;

Step 204, when the software is running, determine whether the sensitive data read is in the read-only area according to the check code;

If yes, perform the step 205; if not, perform the step 206;

Step 205, continue running the software;

Step 206, block running of the software.

Step 201, step 202 and step 203 in the present embodiment are similar to the implementation of step 101, step 102 and the inserting a check code at the point of use of the sensitive data of step 103 in the foregoing embodiment, and are not repeated herein.

Unlike the foregoing implementations, the present embodiment further limits the specific implementation of determining whether to continue running the software. In the present embodiment, continuing running the software if the sensitive data read is in the read-only area; and blocking the software from running if the sensitive data read is not in the read-only area.

Specifically, if the verification of the read-only attribute fails when running, indicating that the operands (i.e., the sensitive data) of the sensitive operations of a certain sensitive instruction are not in the read-only memory area of the process, at this time the present disclosure considers that an abnormality has occurred in the execution of the process, and uses the hardware features of the target platform or the features provided by the operating system to block the process from continuing execution (e.g., sending a segment fault signal to the process, SIGSEGV) to ensure that only the data in the read-only memory area can be used by such sensitive instructions or sensitive operations. In an embodiment, the verification of the read-only attributes and the process blocking can be done by the same hardware feature of the target platform or by the same feature provided by the operating system.

Figure 5:
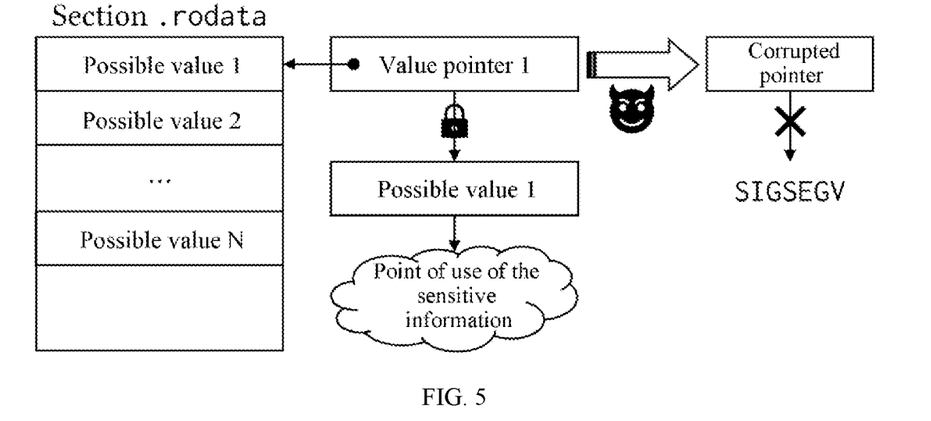
FIG. 5 is a schematic diagram of a software protection method provided by the present disclosure.

In order to understand the present disclosure more intuitively, FIG. 5 is a schematic diagram of a software protection method provided by the present disclosure; as shown in FIG. 5, the sensitive data (e.g., possible value 1, possible value 2, . . . , possible value N, etc.) are stored in the read-only memory area, which are read by pointers when the software is running; under normal circumstances, the sensitive data stored in the read-only area is obtained through pointers when the software is running; when an attacker attacks a pointer, it is possible to point the pointer to the area stored in the attacker's wishes, but in the present embodiment, the segment signal would be sent because the check code detects that the sensitive data is not read in the read-only area, and the software is blocked from continuing running.

On the basis of the foregoing embodiments, by continuing running the software if the sensitive data read is in the read-only area; and blocking the software from running if the sensitive data read is not in the read-only area, that is, by verifying whether the sensitive data to be read is in the read-only area, the integrity verification of the sensitive data is realized, thereby preventing the sensitive data from being corrupted with low performance overheads.

Figure 6:
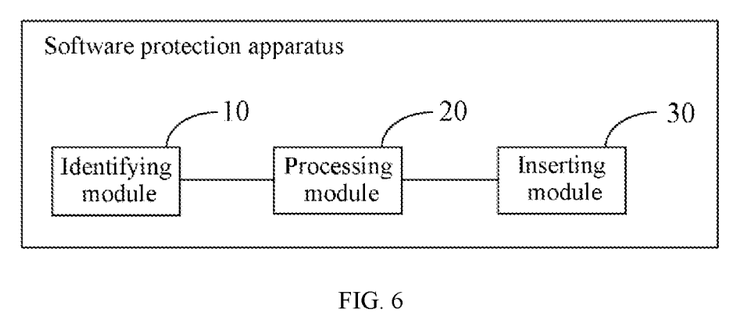
FIG. 6 is a schematic structural diagram of a software protection apparatus provided by the present disclosure.

In a second aspect, an example of the present disclosure provides a software protection apparatus, FIG. 6 is a schematic structural diagram of the software protection apparatus provided by the present disclosure, as shown in FIG. 6, the software protection apparatus includes:

an identifying module 10, configured to identify sensitive data in a software source code, and determine a point of use of the sensitive data; a processing module 20, configured to set the sensitive data in a read-only section of a compilation product of the software source code, so that the sensitive data is stored in a read-only area when a software is running; and an inserting module 30, configured to insert a check code at the point of use of the sensitive data, where the check code is used to check whether the sensitive data read is in the read-only area while the software is running, and determine whether to continue running the software according to the check result.

In other embodiments, the identifying module 10 is specifically configured to: identify data with a special marker as the sensitive data; determine the point of a memory read instruction associated with the sensitive data is the point of use of the sensitive data, where the memory read instruction is used to read the sensitive data by a pointer.

In other embodiments, the identifying module 10 is further configured to: identify an instruction containing sensitive operation in the software source code according to a preset rule, and mark data used by the instruction using the special marker; and associate the data with the memory read instruction.

In other embodiments, the identifying module 10 is further configured to: mark the memory read instruction using the special marker; the inserting module 30 is specifically configured to: insert the check code before the marked memory read instruction; or modify the marked memory read instruction to the memory read code containing the check code.

In other embodiments, the processing module 20 is specifically configured to: identify a collection of legitimate values of the sensitive data, constitute an allowlist, and set data in the allowlist in the read-only section of the compilation product of the software source code; and set the sensitive data as the data in the allowlist.

In other embodiments, the check code inserted by the inserting module 30 is configured for: continuing running the software if the sensitive data read is in the read-only area; and blocking the software from running if the sensitive data read is not in the read-only area.

In other embodiments, the check code is generated based on the features provided by different processors, hardware, or operating systems.

Those skilled in the art can clearly understand that for the convenience and conciseness of the description, the specific working process of the software protection apparatus described above and the corresponding beneficial effect can refer to the corresponding process in the above method example, and will not be repeated herein.

In the software protection apparatus provided by the present disclosure, the identifying module is configured to identify sensitive data in a software source code and determine a point of use of the sensitive data; the processing module is configured to set the sensitive data in a read-only section of a compilation product of the software source code, so that the sensitive data is stored in a read-only area when a software is running; and the inserting module is configured to insert a check code at the point of use of the sensitive data, where the check code is used to check whether sensitive data read is in the read-only area while the software is running, and determine whether to continue running the software according to a check result, that is, in the embodiments of the present disclosure, by inserting the check code at the point of use of the sensitive data, so that whether the sensitive data to be read is in the read-only area is checked by invoking the check code when the software is running, the integrity verification of the sensitive data is realized, thereby preventing the sensitive data from being corrupted with low performance overheads.

Figure 7:
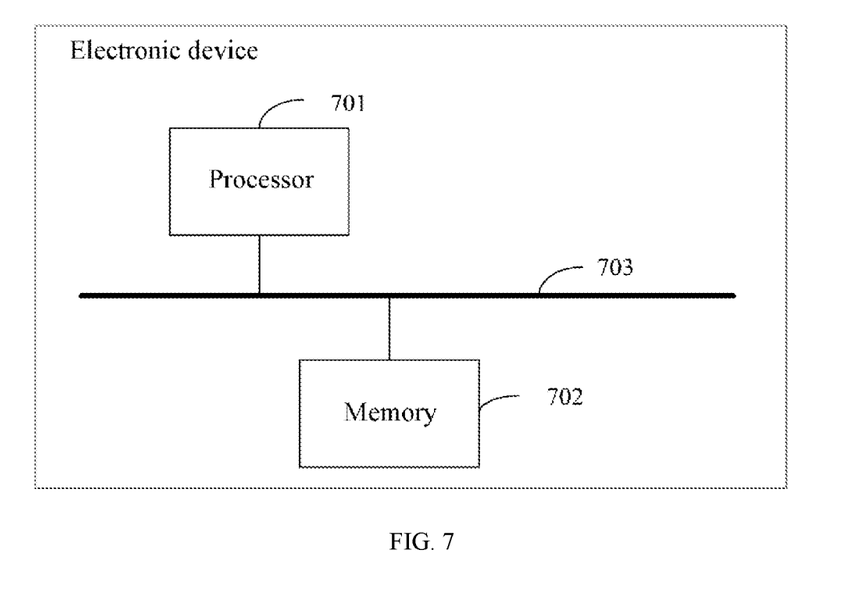
FIG. 7 is a schematic structural diagram of an electronic device provided by the present disclosure.

In a third aspect, an example of the present disclosure provides an electronic device, FIG. 7 is a schematic diagram of the hardware structure of the electronic device provided by the present disclosure, as shown in FIG. 7, including:

at least one processor 701 and a memory 702.

In a specific implementation, the at least one processor 701 executes the computer executable instructions stored in the memory 702, enables the at least one processor 701 to execute the above method, where the processor 701 and the memory 702 are connected via a bus 703.

The specific implementation process of the processor 701 may refer to the above method embodiment, the implementation principles and technical effects therebetween are similar, the present embodiment will not be repeated herein.

In the above embodiment shown in FIG. 7, it should be understood that the processor may be a central processing unit (CPU for short), or other general-purpose processors, a digital signal processor (DSP for short), an application-specific integrated circuit (ASIC for short) and so on. The general-purpose processor can be a microprocessor, or the processor can be any conventional processor, etc. The steps of the methods disclosed in combination with the present disclosure can be directly embodied as being executed by a hardware processor, or being executed by a combination of hardware and software modules in the processor.

The memory may include a high-speed RAM memory, but it may also include a non-volatile storage NVM, such as at least one disk memory.

The bus can be an industry standard architecture (ISA for short) bus, a peripheral component interconnect (PCI for short) bus or an extended industry standard architecture (EISA for short) bus, etc. Buses can be divided into address buses, data buses, control buses, etc. For ease of representation, the bus in the drawings of the present application is not limited to only one bus or one type of bus.

In a fourth aspect, the present disclosure also provides a readable storage medium, the readable storage medium stores computer executable instructions, when the processor executes the computer executable instructions, the above method is implemented.

The readable storage media described above may be any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk, or an optical disk. The readable storage media can be any available media that a general-purpose or specialized computer can access.

An exemplary readable storage medium coupled to the processor, so that the processor can read information from and write information to the readable storage medium. Of course, the readable storage media can also be a part of the processor. The processor and the readable storage media can be located in an application specific integrated circuit (ASIC for short). Of course, the processor and the readable storage media can also be present in the device as discrete components.

In a fifth aspect, the present disclosure provides a computer program product, including a computer program, when the computer program is executed by the processor, the above method is implemented.

The computer program is stored in the memory 702 and configured to be executed by the processor 701 to implement the above method.

Those of ordinarily skill in the art can understand that all or part of the steps to implement the above method embodiments can be performed through hardware related to program instructions. The foregoing program can be stored in a computer-readable storage medium. When the program is executed, the steps of the above method embodiments are executed. The foregoing storage media include various media in which program codes can be stored, such as a ROM, a RAM, a magnetic disk, or an optical disk.

Finally, it should be noted that the above embodiments are merely intended for describing the technical solutions of the present disclosure, rather than limiting the present disclosure. Although the present disclosure has been described in detail with reference to the foregoing embodiments, those of ordinarily skill in the art should understand that they may still make modifications to the technical solutions described in the foregoing embodiments, or make equivalent replacements to some or all technical features thereof; however, these modifications or replacements do not make the essence of the corresponding technical solutions depart from the scope of the technical solutions of the embodiments of the present disclosure.

What is claimed is:

1. A software protection method, executed by a compiler in an electronic device during a compilation process, comprising:
    identifying sensitive data created by the compiler during the compilation process and determining a point of use of the sensitive data, wherein the sensitive data is operands of sensitive operations recognized by the compiler, the sensitive operations comprise program counter update, a sensitive application programming interface (API) call, a security check and a business-critical operation, wherein the business-critical operation comprises transferring and password decryption;
    setting the sensitive data in a read-only section of a compilation product of a software source code, so that the sensitive data is stored in a read-only area when a software is running; and
    inserting a check code at the point of use of the sensitive data, wherein the check code is used to check whether sensitive data read is in the read-only area while the software is running, and determine whether to continue running the software according to a check result
    wherein the identifying the sensitive data created by the compiler during the compilation process and determining the point of use of the sensitive data comprises:
    identifying data with a special marker as the sensitive data; and
    determining that a point of a memory read instruction associated with the sensitive data is the point of use of the sensitive data, wherein the memory read instruction is used to read the sensitive data by a pointer.

2. The method according to claim 1, wherein before the identifying the data with the special marker as the sensitive data, the method further comprises:
    identifying an instruction containing the sensitive operations according to a preset rule, and marking data used by the instruction using the special marker; and
    associating the data with the memory read instruction.

3. The method according to claim 2, wherein the method further comprises: marking the memory read instruction using the special marker;
    the inserting the check code at the point of use of the sensitive data comprises:
    inserting the check code before the marked memory read instruction; or
    modifying the marked memory read instruction to the memory read code containing the check code.

4. The method according to claim 3, wherein the setting the sensitive data in the read-only section of the compilation product of the software source code comprises:
    identifying a collection of legitimate values of the sensitive data, constituting an allowlist, and setting data in the allowlist in the read-only section of the compilation product of the software source code; and
    setting the sensitive data as the data in the allowlist.

5. The method according to claim 2, wherein the setting the sensitive data in the read-only section of the compilation product of the software source code comprises:
    identifying a collection of legitimate values of the sensitive data, constituting an allowlist, and setting data in the allowlist in the read-only section of the compilation product of the software source code; and
    setting the sensitive data as the data in the allowlist.

6. The method according to claim 1, wherein the setting the sensitive data in the read-only section of the compilation product of the software source code comprises:
    identifying a collection of legitimate values of the sensitive data, constituting an allowlist, and setting data in the allowlist in the read-only section of the compilation product of the software source code; and
    setting the sensitive data as the data in the allowlist.

7. The method according to claim 6, wherein the determining whether to continue running the software according to the check result comprises:
    continuing running the software if the sensitive data read is in the read-only area; and
    blocking the software from running if the sensitive data read is not in the read-only area.

8. The method according to claim 1, wherein the setting the sensitive data in the read-only section of the compilation product of the software source code comprises:
    identifying a collection of legitimate values of the sensitive data, constituting an allowlist, and setting data in the allowlist in the read-only section of the compilation product of the software source code; and
    setting the sensitive data as the data in the allowlist.

9. The method according to claim 1, wherein the check code is generated based on features provided by different processors, hardware, or operating systems.

10. An electronic device, comprising: at least one processor and a memory;
    the memory stores computer executable instructions; and
    the at least one processor executes the computer executable instructions stored in the memory, enables the at least one processor to:
    identify sensitive data created during a compilation process and determine a point of use of the sensitive data, wherein the sensitive data is operands of sensitive operations recognized by the compiler, the sensitive operations comprise program counter update, a sensitive application programming interface (API) call, a security check and a business-critical operation, wherein the business-critical operation comprises transferring and password decryption;

set the sensitive data in a read-only section of a compilation product of a software source code, so that the sensitive data is stored in a read-only area when a software is running; and insert a check code at the point of use of the sensitive data, wherein the check code is used to check whether sensitive data read is in the read-only area while the software is running, and determine whether to continue running the software according to a check result wherein the at least one processor is configured to:

identify data with a special marker as the sensitive data; and determine that a point of a memory read instruction associated with the sensitive data is the point of use of the sensitive data, wherein the memory read instruction is used to read the sensitive data by a pointer.

11. The electronic device according to claim 10, wherein the at least one processor is configured to:

identify an instruction containing the sensitive operations according to a preset rule, and mark data used by the instruction using the special marker; and associate the data with the memory read instruction.

12. The electronic device according to claim 11, wherein the at least one processor is configured to:

mark the memory read instruction using the special marker; and insert the check code before the marked memory read instruction; or, modify the marked memory read instruction to the memory read code containing the check code.

13. The electronic device according to claim 12, wherein the at least one processor is configured to:

identify a collection of legitimate values of the sensitive data, constitute an allowlist, and set data in the allowlist in the read-only section of the compilation product of the software source code; and set the sensitive data as the data in the allowlist.

14. The electronic device according to claim 11, wherein the at least one processor is configured to:

identify a collection of legitimate values of the sensitive data, constitute an allowlist, and set data in the allowlist in the read-only section of the compilation product of the software source code; and set the sensitive data as the data in the allowlist.

15. The electronic device according to claim 10, wherein the at least one processor is configured to:

identify a collection of legitimate values of the sensitive data, constitute an allowlist, and set data in the allowlist in the read-only section of the compilation product of the software source code; and set the sensitive data as the data in the allowlist.

16. The electronic device according to claim 15, wherein the at least one processor is configured to:

continue running the software if the sensitive data read is in the read-only area; and block the software from running if the sensitive data read is not in the read-only area.

17. The electronic device according to claim 10, wherein the at least one processor is configured to:

identify a collection of legitimate values of the sensitive data, constitute an allowlist, and set data in the allowlist in the read-only section of the compilation product of the software source code; and set the sensitive data as the data in the allowlist.

18. A non-transitory computer-readable storage medium, wherein the readable storage medium stores computer executable instructions, and when the computer executable instructions are configured to enable a processor to:

identify sensitive data created by the compiler during the compilation process and determine a point of use of the sensitive data, wherein the sensitive data is operands of sensitive operations recognized by the compiler, the sensitive operations comprise program counter update, a sensitive application programming interface (API) call, a security check and a business-critical operation, wherein the business-critical operation comprises transferring and password decryption;

set the sensitive data in a read-only section of a compilation product of a software source code, so that the sensitive data is stored in a read-only area when a software is running; and insert a check code at the point of use of the sensitive data, wherein the check code is used to check whether sensitive data read is in the read-only area while the software is running, and determine whether to continue running the software according to a check result wherein the at least one processor is configured to:

identify data with a special marker as the sensitive data; and determine that a point of a memory read instruction associated with the sensitive data is the point of use of the sensitive data, wherein the memory read instruction is used to read the sensitive data by a pointer.

* * * * *